MAGNETIC WALL DOMAIN SHIFT REGISTER

Filed March 30, 1966 Sheet 1 of 2

INVENTOR
R. F. FISCHER
BY Herbert M. Shapiro
ATTORNEY

United States Patent Office 3,439,352

Patented Apr. 15, 1969

3,439,352

MAGNETIC WALL DOMAIN SHIFT REGISTER

Robert F. Fischer, Livingston, N.J., assignor to Bell Telephone Laboratories, Incorporated, New York, N.Y., a corporation of New York Filed Mar. 30, 1966, Ser. No. 538,736

Int. Cl. G11b *5/00*

U.S. Cl. 340—174 7 Claims

This invention relates to improvements in magnetic wire domain wall devices.

Magnetic wire domain wall devices are devices comprising a material characterized by the formation therein of a reverse magnetized domain in response to a first field in excess of a nucleation threshold and by the advance of that reverse domain in response to a second field in excess of a propagation threshold and less than the nucleation threshold.

Such a device is usually operated by applying a first field in a limited portion of the wire during a write operation and by applying step-along second fields in consecutive portions of the wire to advance reverse domains during a propagation operation. A thin film domain wall device and its operation are disclosed in K. D. Broadbent Patent No. 2,919,432, issued Dec. 29, 1959.

The intrinsic margins of such a device are determined by the difference between the nucleation threshold and the propagation threshold. It is difficult, however, to make magnetic wire with completely uniform properties. Consequently, the nucleation threshold varies considerably along a given wire, and the propogation threshold varies too but to a lesser extent. The operating margins for any given device, accordingly, are determined by the difference between the minimum nucleation threshold and the maximum propagation threshold. Of course, the operating margins are less than the intrinsic margins.

Even the expected operating margins are difficult to achieve in practice. Specifically, a reverse domain defines domain walls with initialized domains to either side of it. When a reverse domain is advanced during a propagation operation it is the "forward" and "trailing" domain walls which are "moved." The propagation operation actually comprises the switching, to a reverse direction, of the flux in the area of the wire next adjacent the leading domain wall by a field less than the switching threshold, and the switching to an initialized direction of that portion of the reverse domain next adjacent the trailing wall of the domain also by a field less than the switching threshold.

The propagation operation is in four phases as is well known. To this end, the propagation circuit includes two conductors each including a set of coils of alternating sense, the coils of the two conductors being interleaved along the wire. A succession of a positive pulse applied to each propagation conductor followed by a negative pulse on each provides the requisite propagation (second) fields.

It has been found that the "switching" of the portion of the reverse domain next adjacent the trailing edge of the domain by such propagation fields is inefficient in practice. That is to say, it is believed that spurious "subdomains" exist in the areas of the wire most recently occupied by reverse domains as those domains are advanced along the wire. The existence of such spurious subdomains reduces the nucleation threshold in those portions of the wire causing a substantial reduction in the minimum nucleation threshold and, thus, in the realizable margins for such devices. Consequently, it has been found desirable to initialize, more forcibly, those portions of the wire as the trailing domain wall is advanced during a propagation operation.

Accordingly, an object of this invention is to provide a new and novel magnetic wire domain wall device having relatively high operating margins.

Another object of this invention is to provide a new and novel magnetic wire domain wall device including means for advancing reverse domains therethrough and means for simultaneously clearing the positions of the wire, most recently occupied by reverse domains, of spurious subdomains.

The foregoing and further objects of this invention are realized in one embodiment thereof wherein a magnetic wire domain wall device comprises a propagation circuit including first and second propagation conductors. Each of those conductors includes a forward and a return path. The coils of the forward path of each propagation conductor couple spaced apart positions of the magnetic wire in a first sense, and the coils along the return path thereof couple interleaved spaced apart positions along the wire in a second sense. In addition, a diode and a resistor are arranged in parallel with each of the forward and the return paths of each conductor. In response to a four-phase propagation pulse sequence, the leading walls of reverse domains are advanced by a propagation field of a first amplitude while the trailing domain wall is advanced by a field of an amplitude greater than that first amplitude.

Compensated molypermalloy wire less than a mill in diameter has been operated in this manner in excess of a 50 kilocycle rate with margins of ±30 percent.

Accordingly, a feature of this invention is a magnetic wire domain wall device comprising a propagation means including first and second portions with coils of a first and second sense respectively wherein the coils of the first and second portions couple interleaved positions along the magnetic wire, and means for providing unequal currents to flow in those first and second portions when pulsed.

The foregoing and further objects and features of this invention will be more fully understood from a consideration of the following detailed discussion rendered in connection with the accompanying drawing in which.

Figure 1:
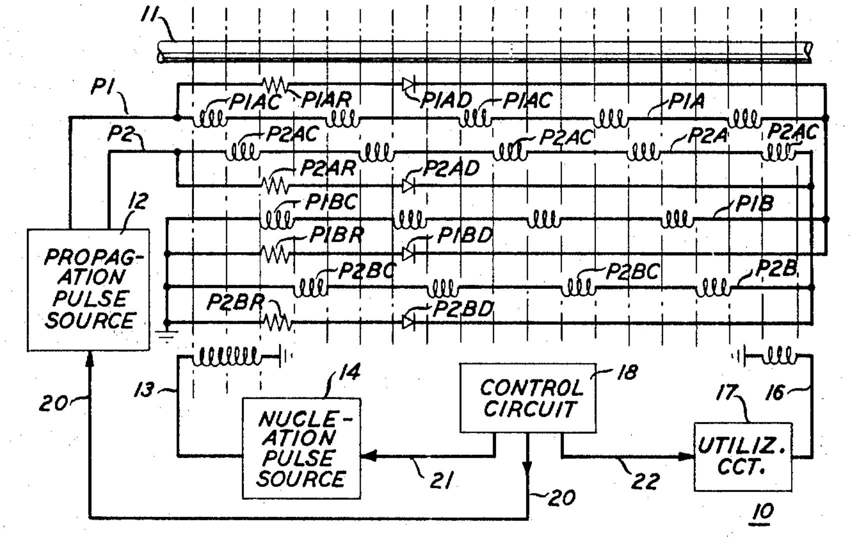
FIG. 1 is a schematic illustration of a domain wall device in accordance with this invention.

FIG. 1 shows a domain wall shift register 10 in accordance with this invention. The shift register comprises a magnetic domain wall wire 11 of the type described. First and second propagation conductors P1 and P2 include sets of series connected coils coupled to wire 11. Each of conductors P1 and P2 includes a forward path P1A and P2A, and a return path P1B and P2B, respectively. The coils of each forward and return path are coupled to wire 11 in a first and second sense, respectively, and are connected electrically in parallel with a resistance and a diode. The resistances and diodes are designated by the path they are associated with plus an R or a D indication respectively. Thus the resistance associated with the path P1A is designated P1AR while the corresponding diode is designated P1AD. The resistance and diode associated with the return path P1B are designated P1BR and P1BD respectively.

The corresponding coils of the conductors interleave such that consecutive positions are coupled by a coil in the forward path of conductors P1, a coil in the forward path of conductor P2, a coil in the return path of conductor P1, and a coil in the return path of conductor P2. This arrangement is illustrated by the coils (C) designated P1AC, P2AC, P1BC, and P2BC occupying consecutive positions from left to right along wire 11 as viewed in FIG. 1. The coil pattern is seen to repeat every four coils and will be seen to define the advance of reverse domains through wire 11 from left to right, as viewed in FIG. 1, when pulsed in a four-phase manner. The conductors P1 and P2 are connected between a propagation pulse source 12 and ground. The various coil representations are shown spaced apart from wire 11 for clarity. It is to be understood that the coils do couple wire 11 and conveniently wrap about wire 11 at the positions indicated.

A nucleation conductor 13 is coupled to an input position along wire 11 defined by the first two coils P1AC and P2AC to the left as viewed in FIG. 1. The nucleation conductor 13 is connected between nucleation pulse source 14 and ground. Similarly, an output conductor 16 is coupled to an output position along wire 11 defined by the last coil P2AC to the right as viewed in FIG. 1. Output conductor 16 is connected between a utilization circuit 17 and ground.

Sources 12 and 14 and circuit 17 are connected to a control circuit 18 by means of conductors 20, 21, and 22, respectively. The various sources and circuits described herein may be any such elements capable of operating in accordance with this invention.

The effectiveness of a domain wall device in accordance with this invention is measured by the extent to which the device functions as does its prior art counterpart to advance information, illustratively, from left to right as viewed in FIG. 1. Accordingly, the advance of a reverse magnetized domain, representing a binary one, from the input to the output position is described. A binary zero is represented by the absence of a reverse domain at a corresponding clock time and thus provides no output at the output position. The advance of a binary zero is not described herein but will be made clear by analogy with the advance of the binary one.

Figure 2:
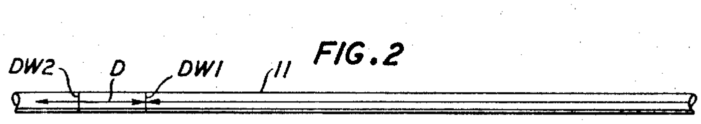
FIG. 2 is a schematic illustration of a portion of the device of FIG. 1.

In operation, nucleation pulse source 14 pulses nucleation conductor 13 under the control of control circuit 18. The pulse so provided is designated PN and is shown at a time $t0$ in FIG. 4. In response to that pulse, a nucleation (first) field is generated at the input position in wire 11 resulting in a reverse magnetized domain there. The reverses magnetized domain is designated D in FIG. 2 and is represented by an arrow directed to the right there. The remainder of wire 11 is assumed initialized to a magnetic condition represented by the arrows directed to the left in FIG. 2. As is well known, the reverse domain is bounded by leading and trailing domain walls DW1 and DW2, respectively.

Figure 3:
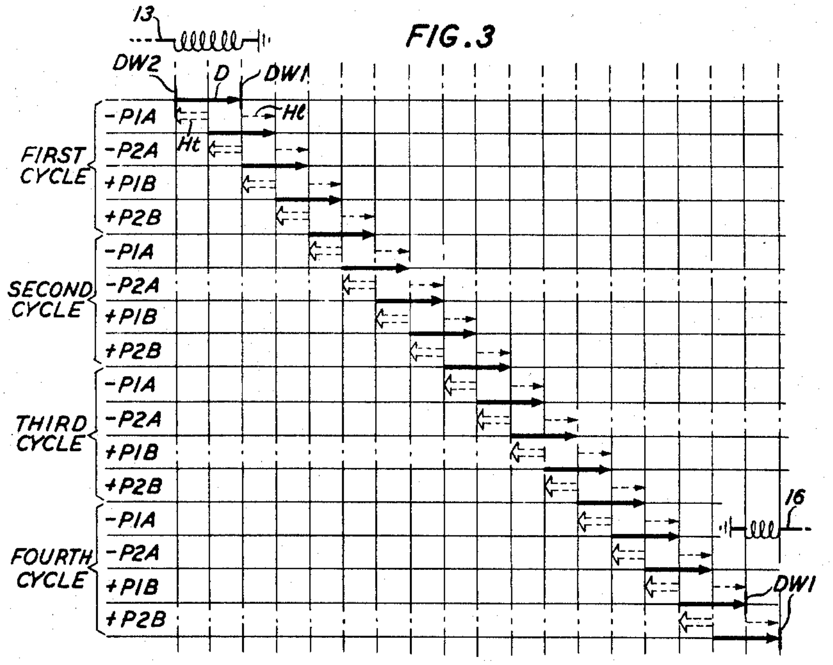
FIG. 3 is a chart depicting the magnetic conditions of the portion of FIG. 2 during the operation thereof.

The initial position of reverse domain D is shown as an arrow directed to the right in the top line of the chart of FIG. 3. Beneath each arrow indication in FIG. 3 are broken arrows designated H1 and H$t$ indicating magnetic fields (H) affecting the leading and trailing domain walls DW1 and DW2 respectively during the advance operation herein. In accordance with this invention, the field H$t$ is larger than the field H1 as indicated by the double shaft on the arrow H$t$ in FIG. 3. This will be discussed in greater detail hereinafter. First, however, it will be shown that a conventional four-phase propagation pulse sequence advances reverse domain D from the input to the output position herein.

Figure 4:
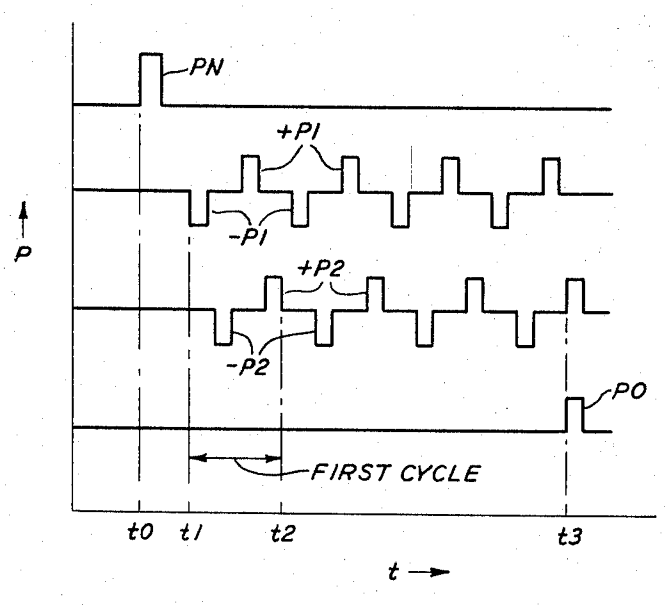
FIG. 4 is a pulse diagram of the operation of the device of FIG. 1.

At the time designated $t1$ in the pulse diagram of FIG. 4, propagation pulse source 12 starts to pulse conductors P1 and P2 under the control of control circuit 18. Those pulses generated changing field patterns depending on the positions of the coils in the conductor pulsed. The fields affecting the domain walls DW1 and DW2 each time a propagation conductor is pulsed are represented by the broken arrows in FIG. 3 as has been stated. The direction of those fields is indicated by the direction of the arrow. Specifically, the field H1 affecting the leading domain wall DW1 is represented by a broken arrow directed to the right. An arrow directed to the right indicates a field in a reverse direction tending to move the domain wall DW1 to the right, as viewed, to expand domain D. On the other hand, the field H$t$, represented by the double-shafted arrow directed to the left, is in a direction to initialize the corresponding portion of reverse domain D thus moving domain wall DW2 to the right as viewed. We will have occasion to discuss field H$t$ further herein.

The pulses generating the fields H1 and H$t$ herein are indicated to the left of the broken arrow indications in FIG. 3 and also in FIG. 4 by the designation of the conductor pulsed. It is clear from FIG. 4 that the propagation pulses are applied in a four-phase sequence of a negative pulse on conductor P1 and a negative pulse on conductor P2 followed by a positive pulse on each conductor. The designations of those pulses in FIG. 3 also include an A or B notation indicating the coil (C) which locates the effective field H$t$ in response to each propagation pulse.

The advance of the domain D may be followed in FIG. 3 in response to four four-phase pulse sequences initiated at time $t1$ (FIG. 4). In response to the first pulse (−P1), the first coil P1AC in the forward path generates the field H$t$ and the first coil P1BC, as viewed from left to right in FIG. 1, of the return path of conductor P1 generates the effective field H1. The domain D advances to the position shown in the second line of FIG. 3. The second pulse of a propagation sequence is a negative pulse on conductor P2. The corresponding coil providing the effective field H$t$ is coil P2AC; that providing an effective field H1 is coil P2BC. The broken arrows representing those fields are shown in positions corresponding to the positions of those coils in FIG. 1. This correspondence is maintained throughout FIG. 3.

A glance at FIG. 3 shows that the fields H1 and H$t$ are generated in pairs by a coil in one path and a coil in the other path of the conductor being pulsed. The fact that the fields are in opposing directions, as indicated by the broken arrows representing those fields in FIG. 3, emphasized that the coils in one path of a propagation conductor couple wire 11 in a sense opposite to that in which the coils in the other path couple wire 11.

The pulse diagram of FIG. 4 shows the propagation pulses desginations with positive and negative signs. In FIG. 3, the indications including B and A designations also are shown with positive and negative signs, respectively, to facilitate the correspondence between FIGS. 3 and 4. The first propagation cycle, then, is completed after a +P2 pulse at a time designated $t2$ in FIG. 4. A propagation (sequence) cycle terminates after each +P2B pulse also as designated in FIG. 3.

It is to be noted that the +P2 pulse in the fourth cycle, corresponding to the last +P2B designation in FIG. 3, advances domain wall DW1 past the coupling between output conductor 16 and wire 11 thus causing a voltage to be generated therein for detection by utilization circuit 17. That output pulse is designated P0 and is shown at time $t3$ in FIG. 4.

Thus, it is shown that an input (nucleation) pulse provides an output herein when a domain wall of a reverse domain nucleated thereby passes the output position. By analogy, the absence of a reverse domain causes no output.

Importantly, in accordance with this invention, a current pulse applied to a conductor P1 or P2 divides such that a current $i-\Delta i$ flows, for example, in the forward path P1A and a current $\Delta i$ flows through the (forward biased) diode P1AD. But the currents $i-\Delta i+\Delta i=i$ flow through the return path P1B because diode P1BD, reverse biased, does not permit current to pass. Similarly, a negative current pulse applied to conductor P1 or P2 divides such that a current $-i$ flows, for example, in the forward path P1A and a current $-i+\Delta i$ flows through the return path P1B and a current $-\Delta i$ flows through the forward biased diode P1BD. Consequently, a positive current pulse generates a smaller field at the coils in the forward path P1A and a larger field at the coils of the return path. A negative current, on the other hand, generates a larger field at the coils of the forward path P1A and a smaller field at the coils of the return path P1B. The same is true of the response to such pulses applied to conductor P2. It has been found advantageous to have the fields differ by about 20 percent. Typical values are five oersteds (halfway between the nucleation and propagation thresholds) and six oersteds for the fields advancing the leading and trailing domain walls of a reverse domain in accordance with this invention. The 20 percent figure is just illustrative however. The field for advancing the trailing domain wall may be as low as 10 percent, larger than that for advancing the leading domain wall, and may exceed the nucleation threshold.

Figure 5:
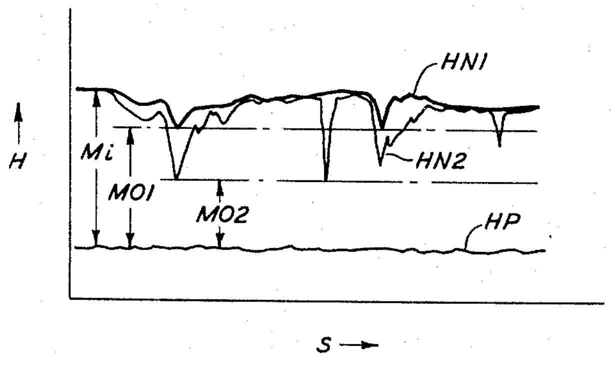
FIG. 5 is a graph of nucleation and propagation levels characteristic of magnetic wire domain wall devices.

The benefits of unequal propagation fields in accordance with this invention may be understood more fully in connection with the graph of FIG. 5. FIG. 5 shows a plot of nucleation threshold with distance S along wire 11. The resulting curve is designated HN1 and can be seen to vary considerably. A plot of the propagation threshold with distance along wire 11 is also shown in FIG. 5. The resulting curve is designated HP and can be seen to vary less than the nucleation threshold.

A measure of the intrinsic margins of a domain wall device is the difference M*i* between a maximum on curve HN1 and a minimum on curve HP. The difference MO1 between a minimum on curve HN1 and a maximum on curve HP similarly is a measure of the operating margins. During operation, however, the nucleation curve is as indicated by curve HN2. Margins realized during operation may, then, be measured by the difference MO2 between a minimum on curve HN2 and a maximum on curve HP. The last difference is obviously lower than the intrinsic or operational margins. In accordance with this invention, the variations in the nucleation level are substantially as shown by curve HN1 even during operation and the realizable operating margins are measured by MO1 above.

It has been found that five microsecond propagation pulses provide ±30 percent margins at a 50 kilocycle rate of operation in accordance with this invention.

FIGS. 1 and 3 indicate the output conductor 16 as coupling wire 11 in a position corresponding to the last coil P2AC to the right as viewed in FIG. 1. For such an arrangement, an output indication is advantageously taken during a pulse P2A of a fifth cycle (not shown). During that pulse, a field H*t* moves the trailing wall of domain D past the coupling between conductor 16 on wire 11 or, more generally, field H*t* initializes the output portion of wire 11. Outputs obtained in this manner are of relatively large amplitude.

What has been described is considered merely illustrative of the principles of this invention. Accordingly, numerous and other arrangements in accordance with the principles of this invention may be devised by one skilled in the art witthout departing from the spirit and scope of this invention.

What is claimed is:

1. In a magnetic wire domain wall device a first propagation circuit comprising a conductor including a forward and a return path, each of said paths including a set of spaced apart couplings of first and second sense respectively, said couplings of said forward and return paths being coupled to interleaved and spaced apart positions along said magnetic wire, and loading means connected in parallel with each of said forward and return paths for permitting unequal currents to flow through said paths when said conductor is pulsed.

2. In a magnetic wire domain wall device, a combination of a first propagation circuit in accordance with claim 1 and a like second propagation circuit, said first and second propagation circuits being coupled to interleaved positions along said magnetic wire such that the coupling senses and the propagation circuits alternate therealong, and means for pulsing said first and second propagation circuits in a four-phase manner.

3. A combination in accordance with claim 2 wherein said loading means comprises a diode and a resistor in series.

4. A combination in accordance with claim 3 wherein said diodes in said forward and return paths are poled in opposite directions.

5. A combination in accordance with claim 4 including means for providing reverse domains in said wire including leading and trailing domain walls therein.

6. A combination in accordance with claim 5 including output means for detecting reverse domains.

7. A combination in accordance with claim 6 wherein said output means includes an output conductor coupled to an output position along said wire and means responsive to the initialization of said wire for providing an indication of a reverse domain there.

References Cited

UNITED STATES PATENTS 3,137,845 6/1964 Snyder ............ 340—174

JAMES W. MOFFITT, *Primary Examiner.*